US012118966B2

(12) United States Patent
Dlugasz

(10) Patent No.: US 12,118,966 B2
(45) Date of Patent: Oct. 15, 2024

(54) DETACHABLE, PITCH CHANGING ACCESSORY FOR LAP-BASED STRINGED INSTRUMENT

(71) Applicant: Timothy Dlugasz, Princeton, MA (US)

(72) Inventor: Timothy Dlugasz, Princeton, MA (US)

( * ) Notice: Subject to any disclaimer, the term of this patent is extended or adjusted under 35 U.S.C. 154(b) by 495 days.

(21) Appl. No.: 17/573,182

(22) Filed: Jan. 11, 2022

(65) Prior Publication Data

US 2022/0223124 A1 Jul. 14, 2022

Related U.S. Application Data

(60) Provisional application No. 63/137,227, filed on Jan. 14, 2021.

(51) Int. Cl.
*G10D 3/147* (2020.01)

(52) U.S. Cl.
CPC .................................... *G10D 3/147* (2020.02)

(58) Field of Classification Search
CPC ............ G10D 3/147; G10D 1/08; G10D 3/00; G10D 1/00
See application file for complete search history.

(56) References Cited

U.S. PATENT DOCUMENTS 4,080,864 A * 3/1978 Jackson ................. G10D 3/147 84/312 P
5,092,214 A 3/1992 Flynn
6,002,075 A 12/1999 Carter
2014/0224096 A1* 8/2014 Callison ................. G10D 3/147 84/312 R

* cited by examiner

*Primary Examiner* — Kimberly R Lockett
(74) *Attorney, Agent, or Firm* — Anderson Gorecki LLP

(57) ABSTRACT

An accessory for a stringed instrument includes a base and at least one leg-actuated lever arm pivotably attached to the base. The base is attached to the body of the instrument. A string is attached to the lever arm such that pivoting of the lever arm via application of force by the player's leg changes tension of the string. In implementations with two lever arms, one lever arm may be calf-actuated, and the other lever arm may be thigh-actuated. Lever arm rotation limiters and spring tension adjusters enable the pitch change to be accurately set and repeatably implemented during play.

15 Claims, 5 Drawing Sheets

DETACHABLE, PITCH CHANGING ACCESSORY FOR LAP-BASED STRINGED INSTRUMENT

TECHNICAL FIELD

The present disclosure is generally related to musical instruments, and more particularly to an accessory that is configured to be fitted to a stringed instrument to enable adjustment of the pitch of at least one string by altering string tension during play using force applied by the leg of the player.

BACKGROUND

Stringed musical instruments often include an elongated neck that is attached to a body. Strings are stretched along the neck and at least partly across the body. One end of each string is secured to a tailpiece or saddle mounted to the body and the other end is attached to a tuning machine that is mounted to a headstock at a distal end of the neck. The pitch produced by a string when plucked is determined by the length of the string, string mass per unit length, and tension on the string. The mass per unit length and tension are typically static values corresponding respectively to string selection and a fixed tuning that is set using the tuning machine before the instrument is played. The length of a string is determined by the distance between the bridge and the nut against which the string rests at locations adjacent to the tailpiece or saddle and the headstock, respectively. In order to produce different musical notes, the effective length of selected strings is changed by pressing those strings against the neck at selected locations. For example, a fretboard on the neck may include protruding frets at specific positions corresponding to specific notes.

Lap-based stringed instruments such as lap steel guitars, resonator guitars, autoharps, dulcimers, and the like are well known. Lap-based instruments are played while positioned flat across the lap of a sitting player. The strings are typically plucked horizontally by one hand while the other hand moves along the neck and presses strings against the neck to alter the pitch of one or more strings as described above. A pedal steel guitar includes a body mounted to a frame and integral knee levers and foot pedals that adjust the tension of individual strings via push, pull, or push/pull rod linkages. The strings and linkages may extend through the body, which is designed to accommodate the mechanical parts that adjust string tension. The player sits at the instrument with the player's legs positioned within the frame, under the body, in order to reach the foot pedals and knee levers.

SUMMARY

In accordance with some implementations, an apparatus comprises: a base configured to be attached to the body of a stringed instrument; and a first leg-actuated lever arm pivotably attached to the base, the first leg-actuated lever arm configured to allow a first string of the stringed instrument to be attached thereto such that pivoting of the leg-actuated lever arm changes tension of the first string.

In accordance with some implementations, a pitch adjustment apparatus configured to be attached to a stringed instrument, comprises: a base configured to be attached to the body of the stringed instrument; a first leg-actuated lever arm pivotably attached to the base, the first leg-actuated lever arm configured to allow a first string of the stringed instrument to be attached thereto such that pivoting of the leg-actuated lever arm changes tension of the first string; and a second leg-actuated lever arm pivotably attached to the base, the second leg-actuated lever arm configured to allow a second string of the stringed instrument to be attached thereto such that pivoting of the leg-actuated lever arm changes tension of the second string.

In accordance with some implementations, an apparatus comprises: a body; a neck attached to the body; a first string having first and second distal ends, the first distal end of the first string attached to a headstock at a distal end of the neck; and a first leg-actuated lever arm pivotably attached to the body and directly attached to the second distal end of the first string such that pivoting of the first leg-actuated lever arm causes changes of tension of the first string.

A variety of other implementations, examples, aspects, and features will be apparent in view of the detailed description and drawings. All examples, aspects, and features mentioned in this document can be combined in any technically possible way.

DETAILED DESCRIPTION

Figure 1:
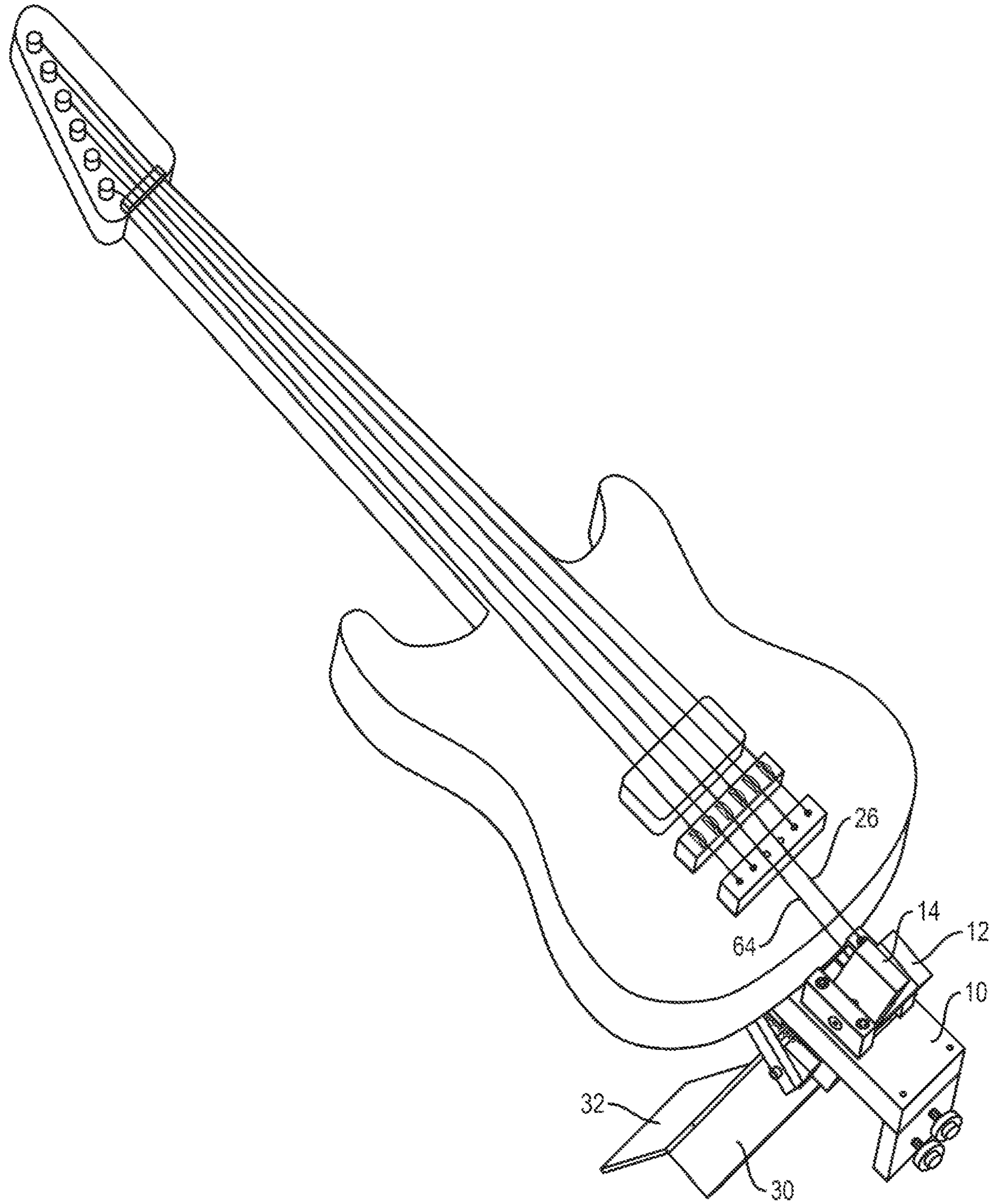
FIG. 1 is a front perspective view of an accessory that is configured to be fitted to a stringed instrument to enable adjustment of the pitch of at least one string during play by altering string tension using part of the player's leg.
Figure 2:
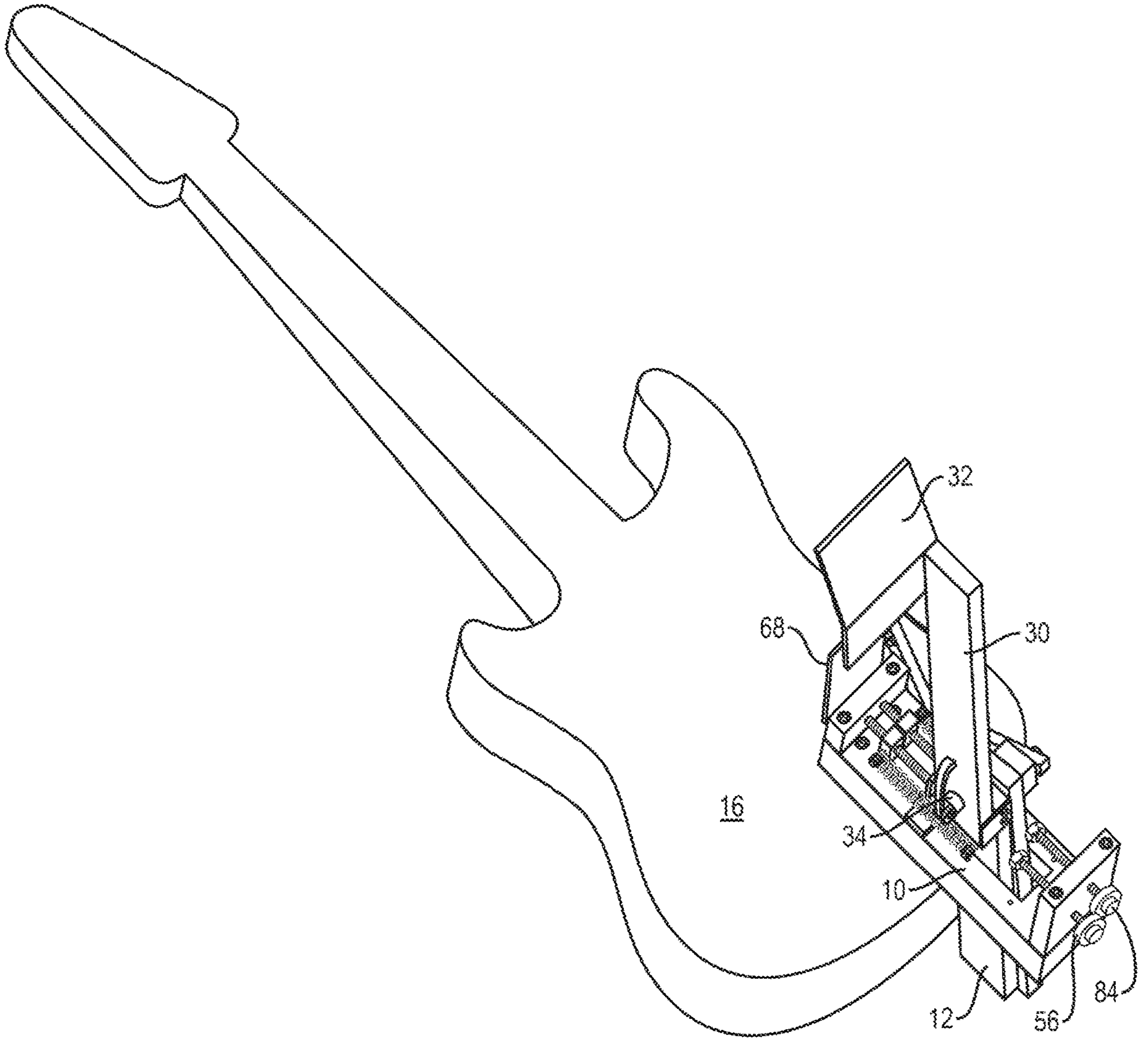
FIG. 2 is a back perspective view of the accessory of FIG. 1.
Figure 3:
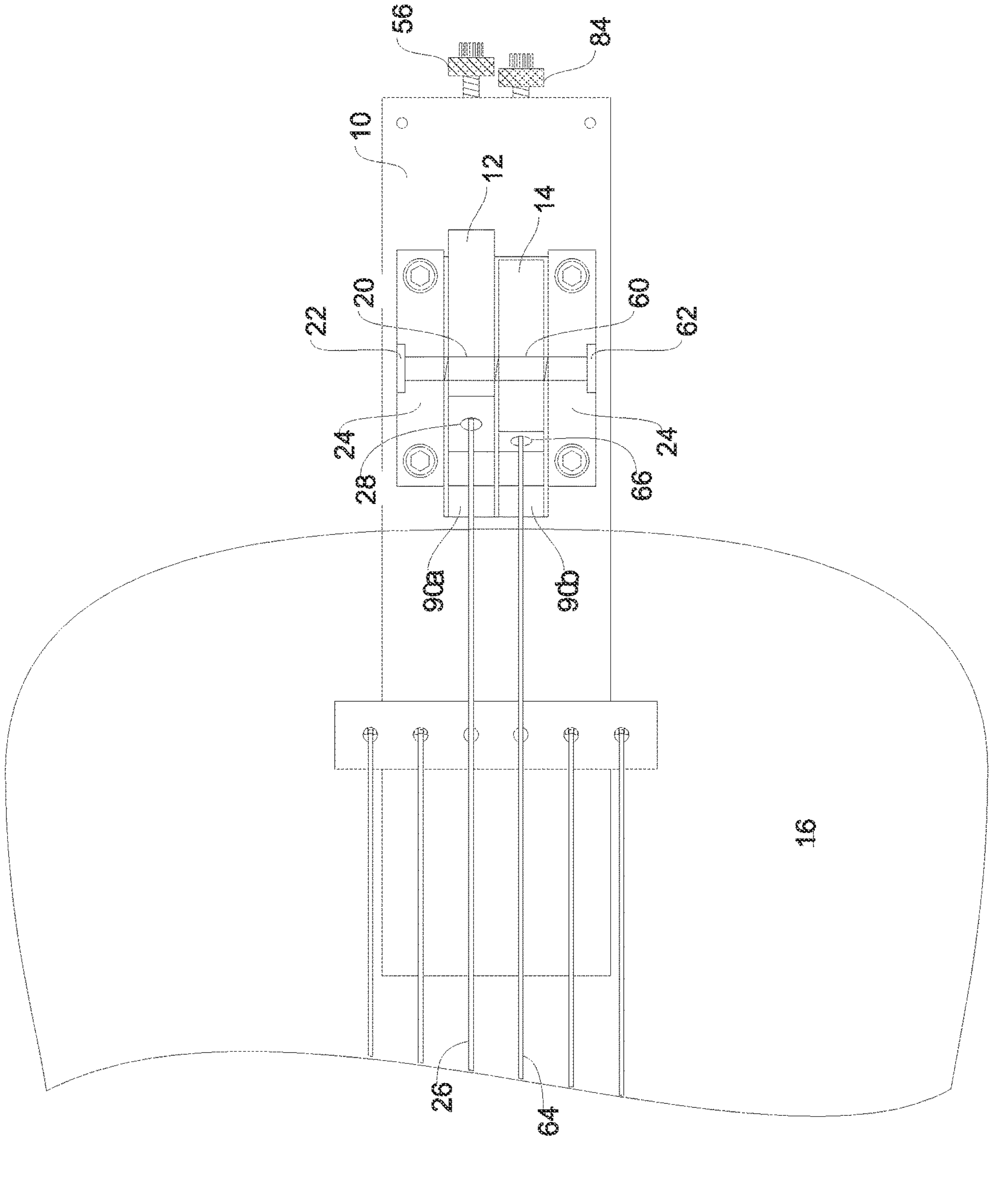
FIG. 3 is a top plan view of the accessory of FIG. 1.
Figure 4:
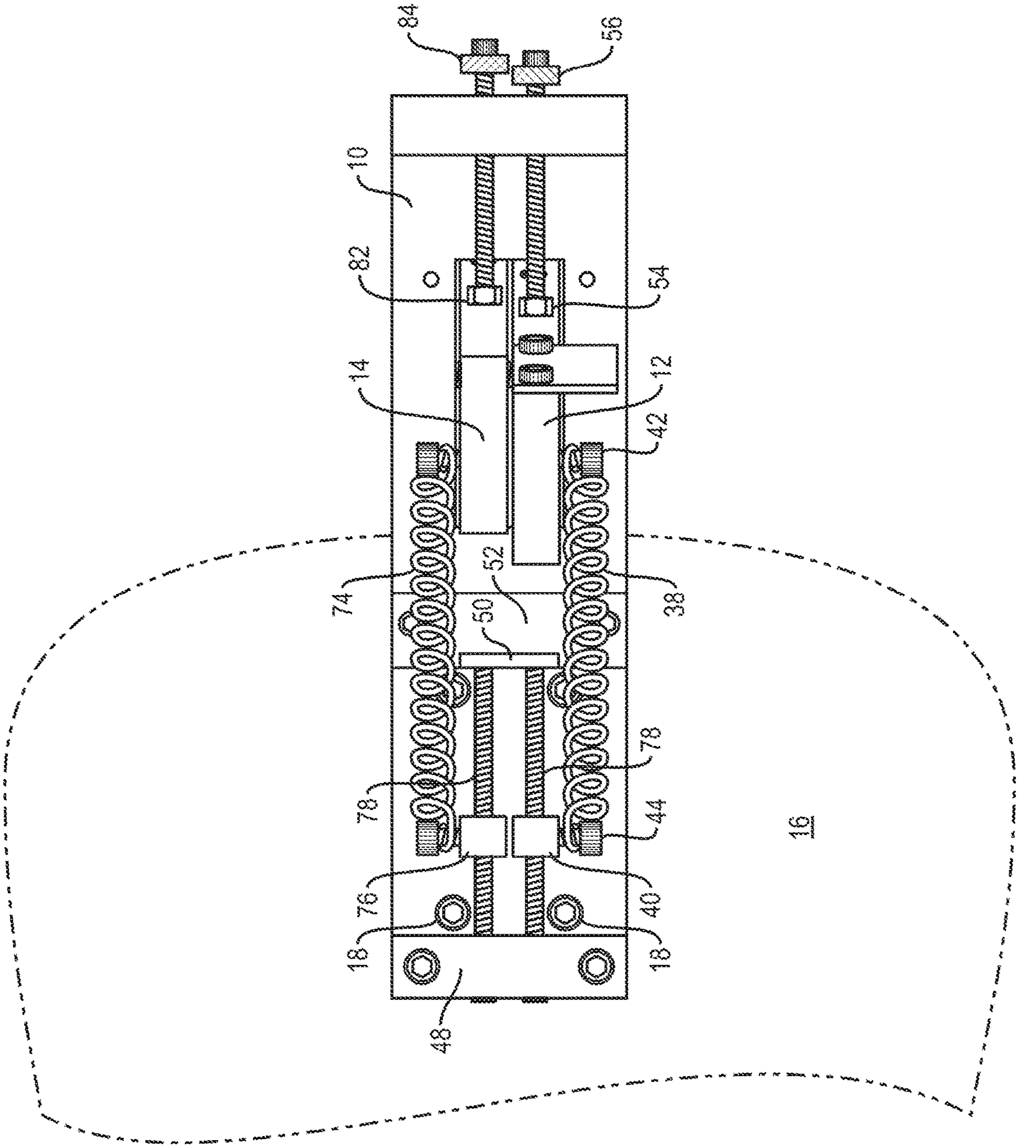
FIG. 4 is a bottom plan view of the accessory of FIG. 1.
Figure 5:
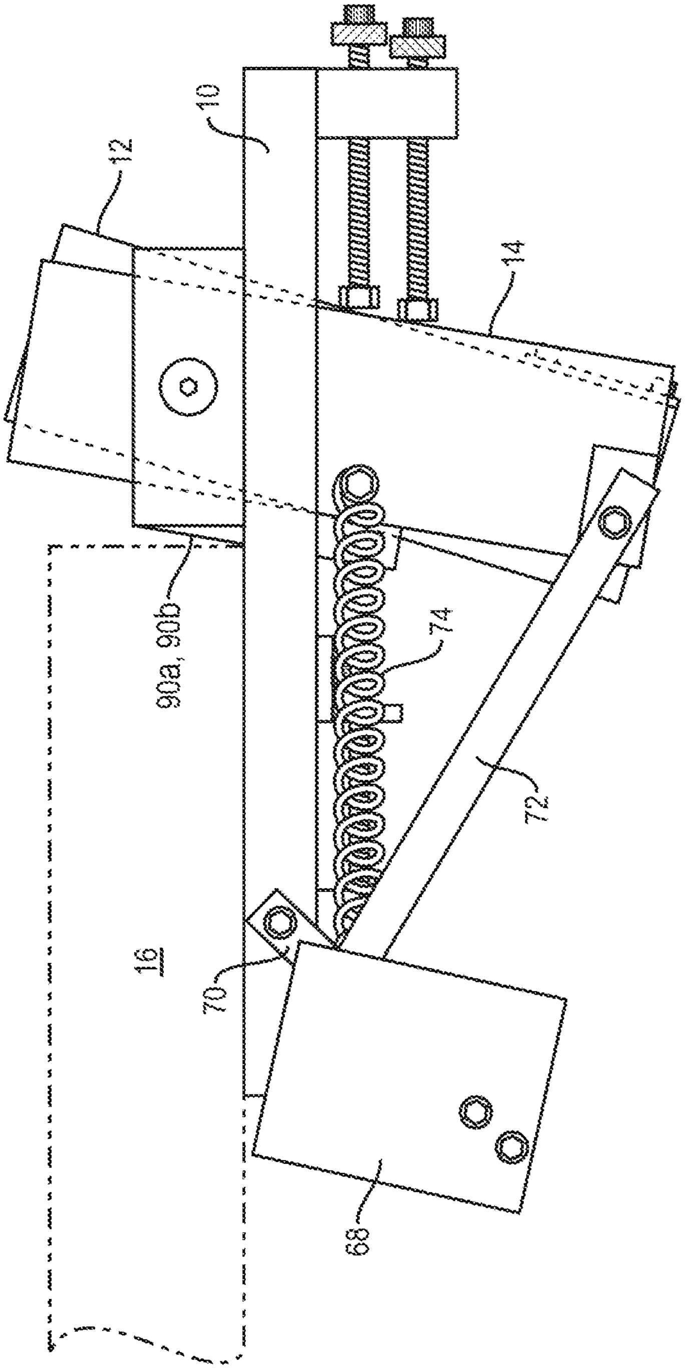
FIG. 5 is a side view of the accessory of FIG. 1.

FIGS. 1 through 5 illustrate an implementation of an accessory that is configured to be fitted to a stringed instrument to enable adjustment of the pitch of at least one string during play by altering string tension using part of the player's leg. The illustrated accessory includes a base plate 10 and two lever arms 12, 14 that enable independent adjustments of the pitches of two strings 26, 64. The first lever arm 12 is calf-actuated, and the second lever arm 14 is thigh actuated, although the parts of the player's body used to move the lever arms should not be viewed as a limitation. The base plate 10 is configured to be attached to the underside (back) of the body 16 of a wide variety of stringed instruments, e.g., as a retrofitted accessory that can be installed and removed as desired. The base plate may be secured to the back of a standard solid body guitar or other stringed instrument with fasteners 18 such as machine screws or wood screws that extend through mounting holes formed through the base plate and into corresponding mounting holes drilled into the body of the instrument. Threaded inserts may be inserted into the holes formed in the body of the instrument to enable use of machine mounting screws. The base plate 10 is secured to the body 16 in a position such that a portion of the base plate extends away from the body at a distal end of the instrument and is in lengthwise alignment with the neck and strings. As will be explained below, this enables the strings to be attached to the accessory without being routed through holes in the body of the instrument.

The calf-actuated lever arm 12 extends through an opening formed in the base plate 10 and is positioned such that a first distal end is located below the bottom of the (horizontally-positioned) body 16 of the instrument and a second distal end extends upward beyond the top of the body of the instrument. The calf-actuated lever arm pivots around a shoulder screw 20 that is inserted into a bearing 22 that is press-fitted into a hole in the lever arm 12. The shoulder screw extends through the bearing between two lever pivot mounts 24. The calf-actuated lever arm 12 is positioned laterally in alignment with a selected one of the strings 26 by selective positioning of the base plate 10 relative to the body 16 of the instrument and use of bearing spacers mounted to the shoulder screw between the calf-actuated lever arm and both the string guide and adjacent thigh-actuated lever arm. The string 26 to be tension-controlled is fed through a string guide hole 28 formed through a first distal end of the lever arm and secured to the calf-actuated lever arm. A lever extension 30 is attached to a second distal end of the calf-actuated lever arm. A fixed calf plate 32 is attached to the lever extension at a distal end opposite to the lever arm attachment bearing. The calf plate provides an ergonomic point of contact via which the player can comfortably move the calf-actuated lever arm in a controlled manner by application of force via the player's calf.

The lever extension 30 may be foldable. The lever extension pivots and can be temporarily fixed at a variety of rotational positions at the point of attachment with the lever arm by a cam latch 34. Thus, the lever extension 30 can be secured at a desired rotational position relative to the calf-actuated lever arm 12 when the instrument is being played and secured in a stowed rotational position in order to enable the instrument to be more easily stored and transported.

The calf-actuated lever arm 12 is held in a default, maximum string tension position by a tension spring 38. The tension spring is attached to the calf-actuated lever arm at a first end and to a spring tension block 40 at a second end. For example, the tension spring may be stretched between a first spring attachment screw 42 that is attached to the calf-actuated lever arm and a second spring attachment screw 44 that is attached to the spring tension block 40. Maximum spring tension is adjusted by altering the distance between the spring tension block 40 and the calf-actuated lever arm 12 using a spring tensioning screw 78 that extends through a tension screw mount block 48 into a threaded hole in the spring tension block 40. The tension screw mount block 48 is fixedly (statically) attached to the base plate 10. Unthreaded openings in an extension 50 of spring tension screw guide 52 keeps the spring tensioning screw, and thus the spring tension block, in alignment with the calf-actuated lever arm. A fixed lever stop 90*a* sets a first limit of rotational travel of the calf-actuated lever arm 12 relative to the base plate 10, i.e., the default, maximum string tension position at which the calf-actuated lever arm is positioned when not actuated. An adjustable tuning stop 54 sets a second limit of rotational travel of the calf-actuated lever arm relative to the base plate, thereby defining the tension change and pitch change of the string that is achieved when the calf-actuated lever arm is fully actuated by the player, e.g., to the minimum string tension. The adjustable tuning stop 54 may be set such that the difference between the maximum and minimum string tension corresponds to a half or whole step change in pitch, for example, and without limitation. The adjustable tuning stop may be formed at a first distal end of a threaded tuning key that traverses a corresponding threaded hole formed in a tuning block that is mounted to the base block. A knurled knob 56 or other feature may be formed at a second distal end of the tuning key to facilitate tool-less setting of the calf-actuated lever string tuning by setting the second limit of rotational travel.

The thigh-actuated lever arm 14 extends through the opening in the base plate 10 adjacent to the calf-actuated lever arm and is positioned such that a first distal end is below the (horizontally-positioned) body 16 of the instrument and a second distal end extends beyond the top of the body of the instrument. The thigh-actuated lever arm pivots relative to the base plate at a shoulder screw 60 that rotates within a bearing 62 that is press-fitted into a hole in the thigh-actuated lever arm. The shoulder screw extends through the bearing between the two lever pivot mounts. The thigh-actuated lever arm is positioned laterally in alignment with a selected one of the strings 64 by selective positioning of the base plate and use of bearing spacers mounted to the shoulder screw between the thigh-actuated lever arm and both the string guide and adjacent calf-actuated lever arm. The string 64 is fed through a string guide hole 66 formed through a first distal end of the thigh-actuated lever arm and secured to the thigh-actuated lever arm.

A linkage between a thigh plate 68 and the thigh-actuated lever arm 14 is formed by first and second elongated members 70, 72. The first elongated member 70 is fixedly attached to the thigh plate 68 at a first distal end and pivotably attached to the base plate 10 at a second distal end, e.g., via a bearing formed by a hole and pivot screw. The second elongated member 72 is pivotably attached to the thigh-actuated lever arm 14 at a first distal end and pivotably attached to the first elongated member 70 at a second distal end. More specifically, the second elongated member is pivotably attached to the first elongated member at a location on the first elongated member between the first and second distal ends thereof. A pivot screw and pivot spacer may be used to pivotably attach the second elongated member to the thigh-actuated lever arm. Force applied against the thigh plate 68 by the player causes the first elongated member 70 to rotate relative to the base plate 10, which in turn causes the second elongated member 72 to transfer force from the rotating first elongated member to the thigh-actuated lever arm 14, thereby rotating the thigh-actuated lever arm and changing the pitch of the string by changing the tension thereof.

A tensioning spring 74 is attached to the thigh-actuated lever arm 14 at a first end and to a spring tension block 76 at a second end, e.g., stretched between a first spring attachment screw that is attached to the thigh-actuated lever arm and a second spring attachment screw that is attached to the spring tension block. The spring tension is adjusted by altering the distance between the spring tension block 76 and the thigh-actuated lever arm 14 using a spring tension adjustment screw 78 that extends through a tension screw mount block into a threaded hole in the spring tension block 48. The tension screw mount block is fixedly attached to the base plate. Unthreaded openings in extension 50 of the unthreaded spring tension screw guide 52 keeps the spring tension screw, and thus the spring tension block, in alignment with the thigh-actuated lever arm. A fixed lever stop 90*b* sets a first limit of rotational travel of the thigh-actuated lever arm relative to the base plate at which the thigh-actuated lever arm is positioned when not actuated. An adjustable tuning stop 82 sets a second limit of rotational travel of the thigh-actuated lever arm relative to the base plate, thereby defining the tension change and pitch change of the string when the thigh-actuated lever is fully actuated. The adjustable tuning stop may be set such that the tension of the string decreases by an amount corresponding to a half or whole step change in pitch. The adjustable tuning stop may be formed at a first distal end of a threaded tuning key that traverses a corresponding threaded hole formed in a tuning block that is mounted to the base block. A knurled knob 84 or other feature may be formed at a second distal end of the tuning key to facilitate tool-less setting of the thigh-actuated lever string tuning.

While not considered to be a limitation of the invention, the illustrated accessory is suitable to be retrofitted to a variety of solid body guitars to provide a lap steel instrument with one or more leg-actuated string pitch adjustment features. The instrument can be set to a standard tuning, e.g., an open chord, using the tuning machines of the instrument. The selected strings, e.g., third and fourth strings, are attached to the respective lever arms and the adjustable tuning stops set to lower spring tension by an amount corresponding to a half or whole step when the respective lever is actuated. This can allow the player to produce, for example, the major chord, 7th, minor, and minor 7th by manipulating the calf and thigh plates while playing. The positive stops enable accurate, hands-free pitch changes.

Although each lever arm has been described as allowing attachment and tension adjustment of a single string, a single lever arm could be attached to multiple strings to provide coordinated tension adjustment. Furthermore, a mechanism to connect two lever arms together temporarily and reversibly could be used to provide coordinated tension adjustment of two or more strings. For example, if the player planned to perform a piece of music that required only the minor 7$^{th}$ leg-actuated adjustment then a linking pin or other feature could be used to secure the lever arms to each other such that both strings would be tension-adjusted by application of force via the player's thigh or calf.

Although an accessory configured to be attached to an instrument has been described, the concepts disclosed herein could be integrated into an instrument. For example, the lever arms could be routed through the body of the instrument and be directly, pivotably attached to the instrument. Moreover, the inventive concepts are not limited to an instrument that is played while positioned on the lap of the player.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. An apparatus comprising:

a base configured to be attached to the body of a stringed instrument;

a first leg-actuated lever arm pivotably attached to the base, the first leg-actuated lever arm configured to allow a first string of the stringed instrument to be attached thereto such that pivoting of the leg-actuated lever arm changes tension of the first string;

a calf plate attached to the first leg-actuated lever arm; and a second leg-actuated lever arm pivotably attached to the base, the second leg-actuated lever arm configured to allow a second string of the stringed instrument to be attached thereto such that pivoting of the leg-actuated lever arm changes tension of the second string.

2. The apparatus of claim 1 comprising a first rotational travel limiter that limits rotational travel of the leg-actuated lever arm in a first direction.

3. The apparatus of claim 2 wherein the first rotational travel limiter defines minimum tension exerted on the first string when the leg-actuated lever arm is rotated in a first direction by a player of the instrument.

4. The apparatus of claim 3 comprising a second rotational travel limiter that limits rotational travel of the leg-actuated lever arm in a second direction.

5. The apparatus of claim 4 wherein the second rotational travel limiter defines maximum tension exerted on the first string when the leg-actuated lever arm is not rotated by the player of the instrument.

6. The apparatus of claim 5 wherein the second rotational travel limiter comprises a string tensioning mechanism that adjustably limits rotational travel of the leg-actuated lever arm in the second direction.

7. The apparatus of claim 1 comprising a thigh plate linked to the second leg-actuated lever arm.

8. The apparatus of claim 7 wherein the thigh plate is linked to the second leg-actuated lever arm by first and second elongated members, the first elongated member fixedly attached to the thigh plate at a first distal end and pivotably attached to the base at a second distal end, the second elongated member pivotably attached to the second leg-actuated lever arm at a first distal end and pivotably attached to the first elongated member at a second distal end.

9. A pitch adjustment apparatus configured to be attached to a stringed instrument, comprising:

a base configured to be attached to the body of the stringed instrument;

a first leg-actuated lever arm pivotably attached to the base, the first leg-actuated lever arm configured to allow a first string of the stringed instrument to be attached thereto such that pivoting of the leg-actuated lever arm changes tension of the first string;

a first rotational travel limiter that limits rotational travel of the leg-actuated lever arm in a first direction, wherein the first rotational travel limiter defines minimum tension exerted on the first string when the leg-actuated lever arm is rotated in a first direction by a player of the instrument; and a second leg-actuated lever arm pivotably attached to the base, the second leg-actuated lever arm configured to allow a second string of the stringed instrument to be attached thereto such that pivoting of the leg-actuated lever arm changes tension of the second string.

10. The apparatus of claim 9 comprising a second rotational travel limiter that limits rotational travel of the leg-actuated lever arm in a second direction, wherein the second rotational travel limiter defines maximum tension exerted on the first string when the leg-actuated lever arm is not rotated by the player of the instrument.

11. The apparatus of claim 10 comprising a calf plate attached to the first leg-actuated lever arm.

12. The apparatus of claim 11 comprising a thigh plate linked to the second leg-actuated lever arm.

13. The apparatus of claim 12 wherein the thigh plate is linked to the second leg-actuated lever arm by first and second elongated members, the first elongated member fixedly attached to the thigh plate at a first distal end and pivotably attached to the base at a second distal end, the second elongated member pivotably attached to the second leg-actuated lever arm at a first distal end and pivotably attached to the first elongated member at a second distal end.

14. An apparatus comprising:

a body;

a neck attached to the body;

a first string having first and second distal ends, the first distal end of the first string attached to a headstock at a distal end of the neck;

a first leg-actuated lever arm pivotably attached to the body and directly attached to the second distal end of the first string such that pivoting of the first leg-actuated lever arm causes changes of tension of the first string;

a calf plate attached to the first leg-actuated lever arm; and a second leg-actuated lever arm pivotably attached to the body, the second leg-actuated lever arm configured to be pivoted to cause changes of tension of the second string.

15. The apparatus of claim 14 comprising a thigh plate linked to the second leg-actuated lever arm.

* * * * *